Nov. 22, 1938.  J. TIPPING  2,137,734
GLASS FEEDER
Filed July 21, 1936  5 Sheets-Sheet 3

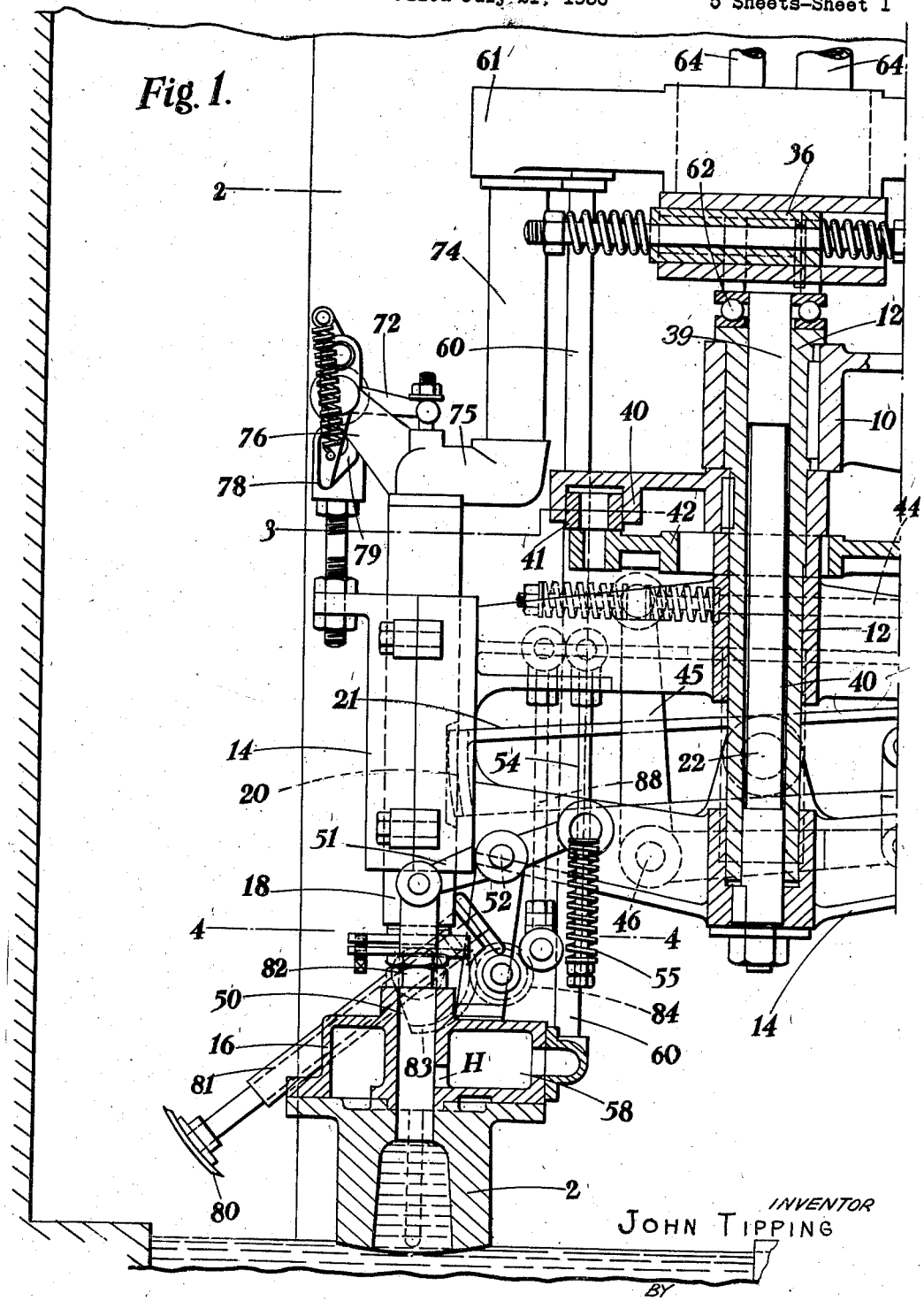

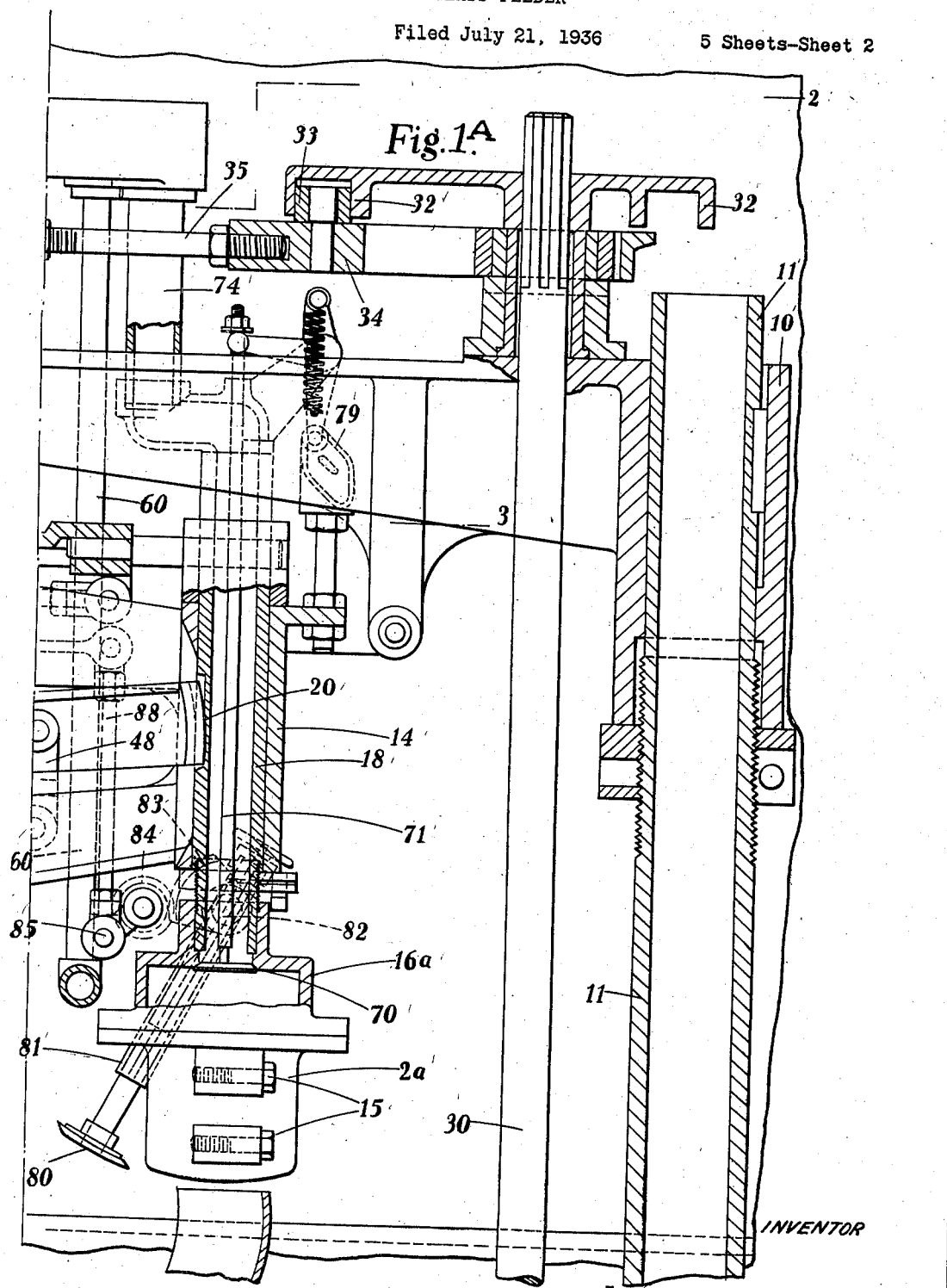

INVENTOR
JOHN TIPPING
BY
Emil Bönnelycke
ATTORNEY

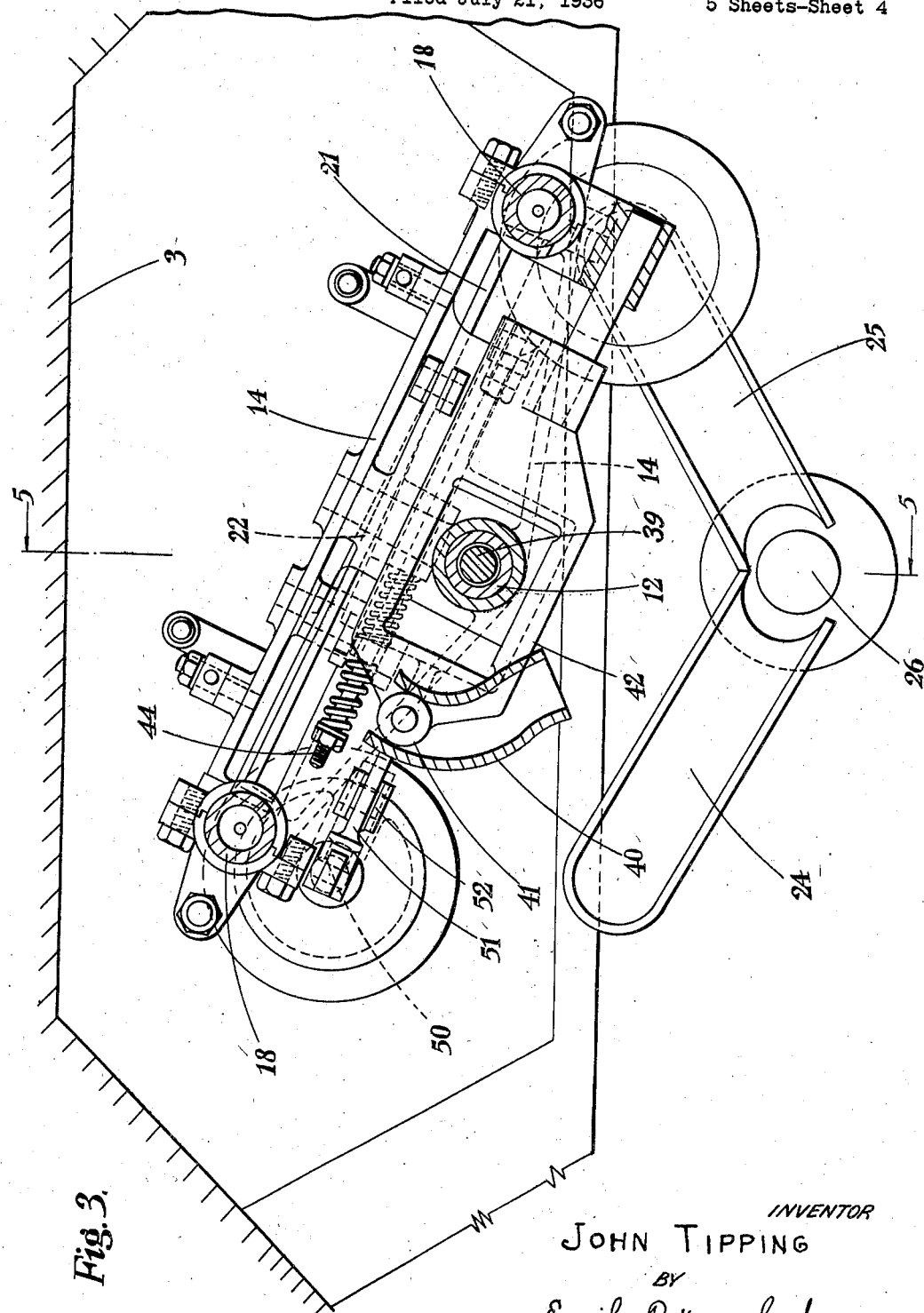

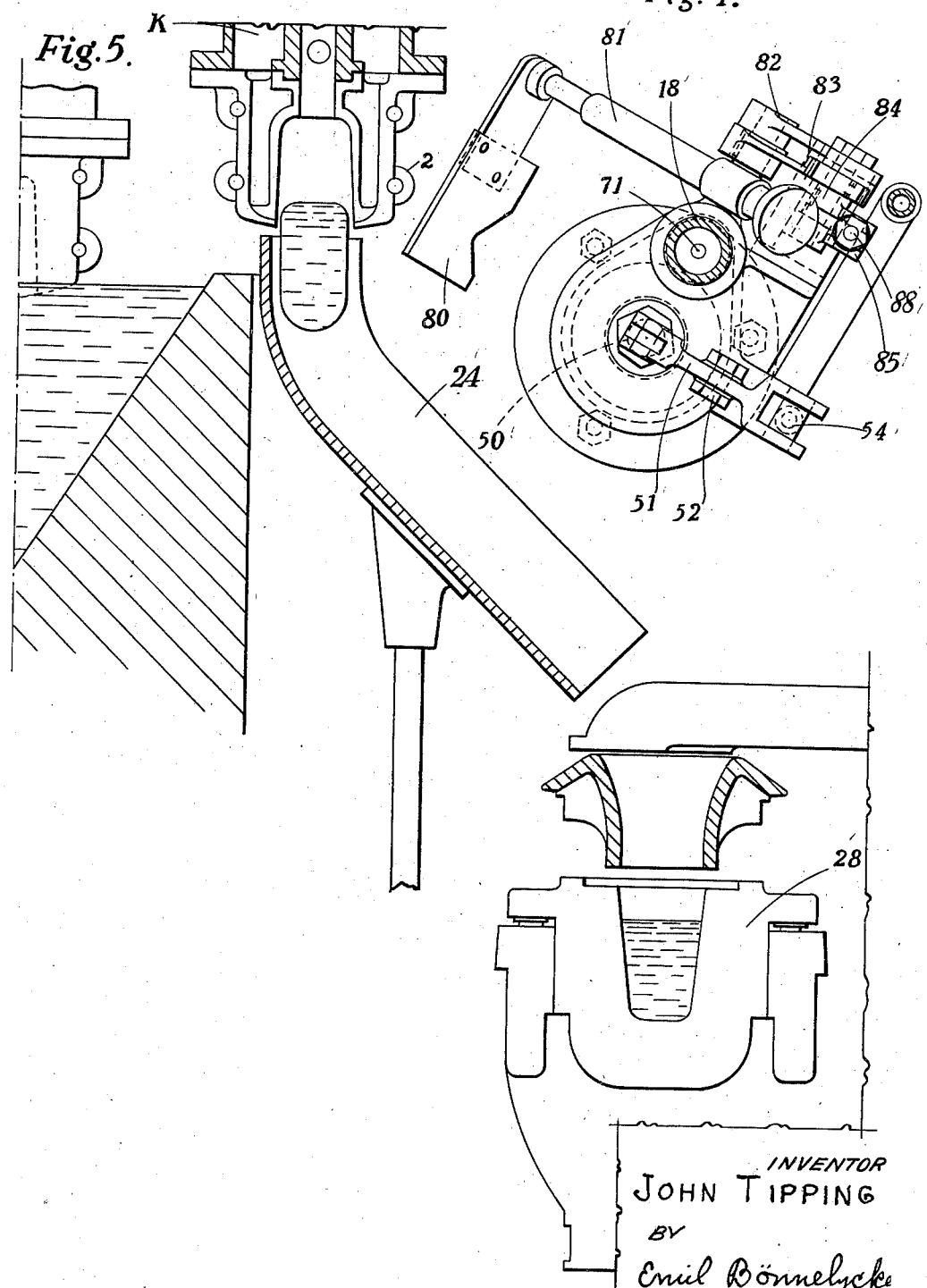

Patented Nov. 22, 1938

2,137,734

UNITED STATES PATENT OFFICE 2,137,734

GLASS FEEDER

John Tipping, Strand, London, England, assignor, by mesne assignments, to Ball Brothers Company, Muncie, Ind., a corporation of Indiana Application July 21, 1936, Serial No. 91,758
In Great Britain July 27, 1935

17 Claims. (Cl. 49—62)

This invention relates to means for feeding gobs of molten glass from a furnace forehearth or the like to the moulds of a glass forming machine and has particular reference to means of the type in which the glass is drawn upwardly into a gathering cup by suction and subsequently discharged from the gathering cup into the mould.

One of the objects of the present invention is to provide an improved form of glass feeding means of the type referred to by which the path of movement of the gathering cup from its charging to its discharging position is made relatively short so as to avoid chilling of the glass.

According to one feature of the invention the feeder comprises a gob cup which is caused to dip into a forehearth and, after being filled with glass as the result of suction applied to the interior thereof, is swung laterally through a relatively small angle into a position over a gob chute which bridges the gap between the cup and the mould into which the gob is delivered.

According to another feature of the invention the feeder is equipped with a pair of gathering cups adapted to be used alternately, the arrangement being such that one is lowered and charged whilst the other is raised and discharged. Also, one may be swung inwardly to the forehearth as the other is swung outwardly to a position over its discharging chute.

In order that the said invention may be clearly understood and readily carried into effect, the same will now be more fully described with reference to the accompanying drawings in which:—

Figs. 1 and 1A are vertical sectional views through a feeding device produced in accordance with the invention;

Fig. 3 is a sectional plan view taken on the line 3—3 of Figs. 1 and 1A;

Fig. 4 is a fragmentary sectional plan view taken on the line 4—4 of Fig. 1; and Fig. 5 is a fragmentary vertical sectional view taken on the line 5—5 of Fig. 3.

Figure 2:
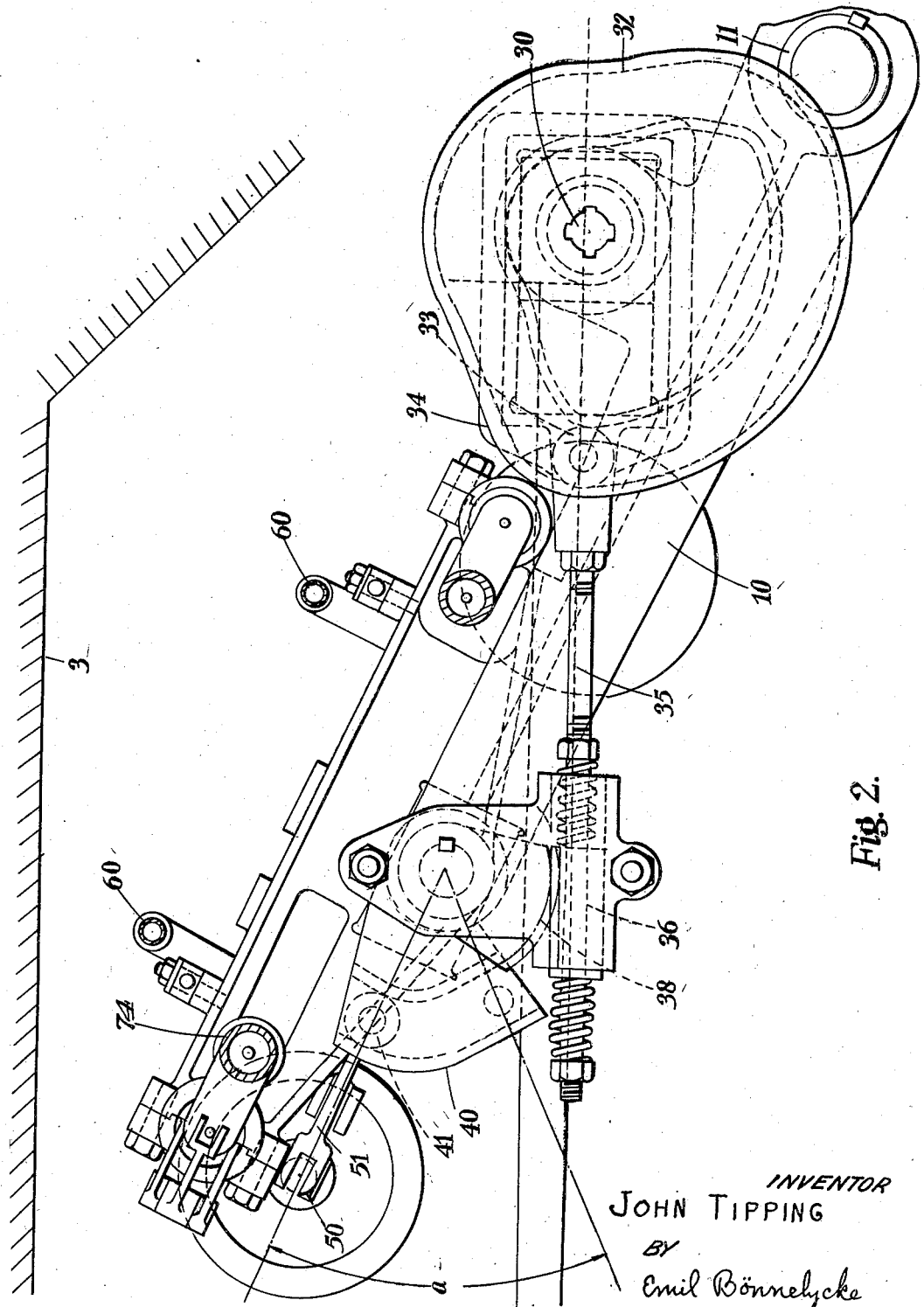
Fig. 2 is a sectional plan view taken on the line 2—2 of Figs. 1 and 1A.

The feeder illustrated in the accompanying drawings is a twin feeder having two gathering cups 2 and 2a adapted to be raised and lowered alternately and to co-operate with a single forehearth which extends outwardly from the furnace and the front wall of which is indicated at 3. The feeder is suspended in position over the forehearth from a horizontally disposed bracket or arm 10 which is adjustably mounted in position on a pillar 11 which may be fixed to the floor or carried by a stationary part of the glass forming machine.

The outer end of the arm or bracket 10 has keyed therein a downwardly depending sleeve or central housing 12 the lower end of which affords a pivot on which a frame 14 is adapted to turn in order to swing the gathering cups between their charging and discharging positions.

Each gathering cup is made up of two half portions suitably bolted together as by bolts 15 and formed with vacuum grooves of known form, the whole being clamped to the underside of a gathering head, it being appreciated that the dimensions of the gathering cup will depend upon the type and upon the dimensions of the moulds to be supplied with glass.

The gathering heads are indicated at 16 and 16a and each is secured to the lower end of one of a pair of vertically movable sleeves 18 slidably mounted in position in the outer ends of the frame 14. Each sleeve is formed over a part of its length with a toothed rack 20, which racks engage with the opposite ends of a toothed sector or lever 21 pivotally mounted on the frame 14 at 22 and arranged so that by its pivotal movements one gathering head and its cup are raised whilst the other gathering cup and head are lowered.

Each gathering cup is adapted to be swung laterally through a relatively small angle between its charging and discharging positions and the magnitude of the angle of swing is indicated by the angle $a$ in Fig. 2. Also, each cup when reaching its discharging position is adapted to discharge its contents into an inclined chute, such chutes being indicated at 24 and 25 in Fig. 3. It will be observed that the chutes are disposed immediately in front of the forehearth so that they converge and bridge the gaps between the two discharging points of the gathering cups and a common delivery point 26 at which the blank moulds 28 (Fig. 5) of the glass forming machine are filled as they pass or are brought in position therebeneath.

The feeder may be operated from any convenient source of power but is preferably actuated from the glass forming machine, as, for example, through the medium of a vertical drive shaft 30 the lower end of which is suitably coupled with the glass forming machine and the upper end of which is journalled in the aforesaid arm or bracket 10.

The means for swinging the gathering cups between their charging and discharging positions preferably comprise a cam 32 secured to the upper end of the continuously rotating driving shaft 30, said cam being formed with a cam track engaged by a cam roller 33 carried by a horizontal slider 34 connected by a connecting rod 35 with a toothed rack 36. The latter is in mesh with a toothed sector 38 (Fig. 2) which is mounted in position on and secured to the upper end of a vertical shaft 39 which extends downwardly through the stationary sleeve 12 and is secured at its lower end to the angularly movable frame 14. It will be observed from Fig. 2 that the cam 32 comprises two concentric and two eccentric portions so that during one rotation of the cam each cup will be moved from its charging position into its discharging position or vice versa and back again with a period of rest at each position.

The aforesaid stationary sleeve 12 also carries a stationary cam plate 40 of segmental formation provided on the underside thereof with a cam track engaged by a cam roller 41 carried by a horizontal slider 42 connected by a connecting rod 44 with the upper end of a bell crank lever 45. The latter is pivotally mounted at 46 on the angularly movable frame 14 and the other arm of the bell crank lever is coupled by a link 48 with the aforesaid toothed sector or lever 21. Hence, during the aforementioned swinging movements, the gathering cups will also be raised and lowered by the action of the cam plate 40 and the toothed sector 21.

Each gathering cup is preferably formed at its upper end with an opening for the reception of a sealing plunger 50 which is also adapted to be raised and lowered. For this purpose, the sealing plunger is provided with a stem extending upwardly through the gathering head and connected at its upper end with one end of a lever 51 which is pivotally mounted at 52 on an upwardly extending part of the gathering head, the opposite end of the lever being yieldably connected to a vertical connecting rod 54 by a heavy spring 55 which holds the end of the lever against vertical movement whereby on the up and down movements of the gathering cups, the levers 51 are moved about their connections with the connecting rods to cause such displacements of the sealing plungers as are necessary in order to cover and uncover the compressed air ports H which are formed in sleeve portions provided within the gathering heads. The said ports are each connected with a chamber 58 which in turn communicates with the lower end of a compressed air pipe 60 and each of the said pipes extends upwardly and extends into a compressed air and vacuum distributor 61 arranged in position at the upper part of the feeder and carried by a thrust bearing 62 provided on the upper end of the stationary sleeve 12. The said distributor is connected with suitable sources of compressed air and vacuum by the pipes 64 and is adapted to be oscillated to and fro with the angularly movable frame 14.

Each gathering head is also provided with a vacuum valve 70 adapted to be operated by a connecting rod 71 extending upwardly through the axially movable sleeve 18 so that the upper end of the rod is connected with one arm of a bell crank lever 72 and the upper ends of the sleeves 18 are connected with the compressed air and vacuum distributor 61 by a pair of vacuum pipes 74. The lower ends of the pipes 74 each include an elbow 75 through the upper side of which the connecting rod 71 projects and the upper ends of the pipes are slidably mounted in the distributor. Each of the bell crank levers 72 is pivotally mounted in a bracket 76 projecting upwardly and laterally from the elbow 75 and one arm of each lever 72 is provided with a cam roller 78 held by a spring in contact with a cam track 79 provided on an upwardly extending portion of the angularly movable frame 14, the arrangement being such that as a gathering cup is lowered for gathering the cam 79 and the bell-crank lever 72 associated with that cup will be brought into operation to open the vacuum valve 70.

A cut-off knife 80 is also provided on each gathering head, the said knives being carried by arms 81 pivotally mounted at 82. The knives are adapted to be actuated at the appropriate times by toothed sectors 83 which are keyed to the arms 81 and are in mesh with pinions 84. Keyed to the latter are levers 85 having their outer ends connected with vertically disposed connecting rods 88 which are held at their upper ends on the frame 14. By the arrangement, the vertical movements of the gathering heads serve to swing the shearing knives into and out of their operative positions.

In operation, the gathering heads are alternately swung into a gathering position and caused to rest in that position for a predetermined period of time, the swinging movements being brought about by the operation of the continuously rotating cam 32, cam roller 33, connecting rod 35, toothed rack 36, toothed sector 38, vertical shaft 39 and the angularly displaceable frame 14. During movement of a gathering cup, for example the cup 2, into a gathering position, the cam roller 41 is operated upon by the stationary cam track 40 to displace the horizontal slider 42, connecting rod 44, bell-crank lever 45, link 48 and toothed sector or lever 21 so as to cause the cup 2 to be lowered into the glass and the other cup 2a to be raised. Also, by the downward movement of the gathering cup 2 and its associated gathering head 16, the lever 51 is actuated to lower the sealing plunger 50 of the gathering cup 2 into a position in which the compressed air port H is closed and, in addition, under the action of the downward movement of the sleeve 18 and the engagement of the cam roller 78 with the cam plate 79, the vacuum valve 70 is opened to establish communication between the interior of the lowered gathering cup and the source of vacuum. As a result, the lowered gathering cup becomes filled with a charge of glass. During the descent of the gathering cup in question, the cut-off knife 80 associated with that cup is swung by the action of the pinion 84, sector 83 and arm 81 into the raised position shown at the left hand side of Fig. 1.

As will be seen from the contour of the cam 32, the gathering cup is caused to pause in the gathering position for a short period which in practice, is just sufficient to enable the cup to be filled whereupon the continued movement of the cam causes the cup 2 to rise and to be swung or displaced laterally from a position over the forehearth into a discharging position over the feeding end of the chute 24. It will be appreciated that, here again, the swinging movement necessary to move the gathering cup 2 through the angle a (Fig. 2) is brought about by the operation of the toothed rack 36 and toothed sector 38 and that simultaneously therewith the cam roller 41 is operated upon by the stationary cam 40 to displace the toothed sector or lever 21 so as to raise the filled cup. By the upward movement of the gathering head, the pinion 84, sector 83 and arm 81 are brought into operation to swing the cut-off knife 80 rapidly under the filled gathering cup so as to sever any glass depending therefrom, the movement being such that the knife is not brought to rest until it reaches the opposite side of the cup. From the contour of the cam 40 it will be appreciated that the upward movement of the gathering cup is a gradual one and that this movement takes place whilst the cup is being swung into its discharging position. By the time that the latter position has been reached, the vacuum valve has been closed and the sealing plunger 50 has risen sufficiently to uncover the compressed air port H to admit compressed air through the chamber K and thereby to eject the charge of glass from the cup into the chute 24 whence it passes into one of the moulds of the forming machine as they are brought by continuous or intermittent movement beneath the delivery point 26.

Whilst the gathering cup 2 is being discharged the other gathering cup 2a is being charged, the sequence of operations being the same for each cup and the cup being discharged alternately.

Having thus described my said invention what I claim as new therein and desire to secure by Letters Patent is:—

1. In combination with a forehearth, a pair of gob chutes having their inlet ends adjacent the forehearth and their outlet ends converging toward a common discharge point, a pair of gathering cups, a laterally swinging frame carrying said cups, means for oscillating said frame to move said cups alternately from a position over said forehearth to a position over the inlet end of one of said chutes, means responsive to the oscillatory movement of said frame for lowering the cup then positioned over the forehearth and raising the cup then positioned over one of the chutes, a knife associated with each said cup, and means responsive to the upward movement of each said cup for moving the knife associated therewith across the bottom thereof.

2. In combination with a forehearth, a pair of gob chutes having their inlet ends adjacent the forehearth and their outlet ends converging toward a common discharge point, a pair of gathering cups, one of which cooperates with each of said chutes, a laterally swinging frame carrying said cups, means for oscillating said frame to move said cups alternately from a position over said forehearth to a position over the inlet end of one of said chutes, means responsive to the oscillatory movement of said frame for lowering the cup then over the forehearth and raising the cup then over a chute, a plunger for sealing the upper end of each said cup, and means responsive to the upward and downward movement of each said cup for moving said plungers upwardly and downwardly respectively.

3. In combination with a forehearth, a pair of gob chutes having their inlet ends adjacent the forehearth and their outlet ends converging to a common discharge point, a pair of gathering cups, one of which cooperates with each of said chutes, a laterally swinging frame carrying said cups, means for oscillating said frame to move said cups alternately from a position over said forehearth to a position over the inlet end of one of said chutes, means responsive to the oscillatory movement of said frame for lowering the cup then over the forehearth and raising the cup then over a chute, a plunger for sealing the upper end of each said cup, a knife associated with each cup, means responsive to the upward movement of said cup for moving its associated knife across the bottom thereof, and means responsive to the upward and downward movement of the cup for moving said plungers upwardly and downwardly respectively.

4. The combination with a forehearth for molten glass, a pair of gob chutes arranged in position adjacent the front of the forehearth and leading to a common outlet, a pair of gathering cups, and means for alternately swinging said cups laterally through a relatively small angle from a position over the forehearth to a position over one of the gob chutes.

5. In combination with a forehearth, a pair of gob chutes arranged in position along the front of the forehearth with their inlet ends adjacent the forehearth and their outlet ends converging to a common point, a pair of gathering cups, means for swinging said cups laterally through a relatively small angle to position one cup over the forehearth and the other cup over one of the gob chutes, and means for lowering the cup then over the forehearth and for raising the cup then over one of the chutes.

6. In combination with a forehearth, a pair of gob chutes arranged in position along the front of the forehearth with their inlet ends adjacent the forehearth and their outlet ends converging to a common point, a pair of gathering cups, means including a continuously rotating cam member for swinging said cups laterally through a relatively small angle to move one of said cups over the forehearth and the other of said cups over one of the gob chutes, and means for lowering the cup then over the forehearth and for raising the cup then over one of the chutes.

7. The combination comprising a forehearth for molten glass, a pair of gob chutes arranged in position along the front of the forehearth with the inlet ends thereof adjacent the forehearth and the outlet ends thereof converging to a common point, an angularly movable frame adjacent said forehearth and arranged for oscillatory movement, a pair of gathering cups depending from said frame, means for swinging said frame to move said cups laterally through a relatively small angle to position one of said cups over the forehearth and the other of said cups over one of the gob chutes, and means for lowering the cup then over the forehearth and for raising the cup then over one of the chutes.

8. In combination with a forehearth, a pair of gob chutes arranged in position adjacent the front of the forehearth and leading to a common point, an angularly movable frame adjacent said forehearth and arranged for oscillatory movement, a pair of gathering cups depending from said frame, means for oscillating said frame to alternately swing said cups laterally through a relatively small angle to position one of said cups over the forehearth and the other of said cups over one of the gob chutes, and means responsive to the movement of said frame for raising the cup then over one of the gob chutes and lowering the cup then over the forehearth.

9. Apparatus for feeding gobs of molten glass from a furnace forehearth to the molds of a glass forming machine comprising a pair of gob chutes arranged in position along the front of the forehearth with their inlet ends adjacent the forehearth and their outlet ends converging to a common discharge point, a pair of gathering cups, a gathering head associated with each said cup and having a suction valve and a pressure valve therein for controlling communication between the interior of said head and sources of suction and pressure, respectively, means for swinging said cups laterally through a relatively small angle to position one of said cups over the forehearth and the other of said cups over one of the gob chutes, means for lowering the cup then over the forehearth and for raising the cup then over one of the gob chutes, means for opening the suction valve in each said gathering head as the cup associated therewith is being lowered, and means for opening the pressure valve in each cup as said cup is being raised.

10. In combination with a forehearth, a pair of gob chutes arranged in position adjacent the front of the forehearth and leading to a common point, an angularly movable frame adjacent said forehearth and arranged for oscillatory movement, a pair of gathering cups depending from said frame and vertically movable relative thereto, means for oscillating said frame laterally through a relatively small angle to position one of said cups over the forehearth and the other of said cups over one of the gob chutes, and means responsive to the oscillatory movement of said frame for moving said cups vertically relative to said frame.

11. In combination with a forehearth, a pair of gob chutes arranged in position along the front of the forehearth with their inlet ends adjacent the forehearth and their outlet ends converging to a common point, a pair of gathering cups, means including a cam and a cam roller for swinging the cups laterally to position one of said cups over the forehearth and the other of said cups over one of the gob chutes, and means responsive to the lateral movement of the cups for moving said cups vertically.

12. In combination with a forehearth, a pair of gob chutes arranged in position along the front of the forehearth with their inlet ends adjacent the forehearth and their outlet ends converging to a common point, an angularly displaceable frame adjacent said forehearth and arranged for oscillatory movement, a pair of gathering cups carried by said frame, means for oscillating said frame to position one of said cups over the forehearth and the other of said cups over one of said gob chutes, and means for raising and lowering said cups, said last mentioned means including a continuously rotating cam, a cam follower, a bell crank lever connected to said follower, a lever pivotally mounted on said frame and connected to said bell crank and having a gear sector at each end thereof, and a rack bar associated with each said cup and engaging the gear sectors on the ends of said toothed lever.

13. In combination with a forehearth for molten glass, a pair of gob chutes arranged in position along the front of the forehearth with their inlet ends adjacent the forehearth and their outlet ends converging to a common point, a pair of gathering cups, a sealing plunger associated with each said cup, means for swinging said cups laterally through a relatively small angle to position one of said cups over the forehearth and the other of said cups over one of the gob chutes, means for lowering the cup then over the forehearth and for raising the cup then over one of the chutes, and means responsive to the upward and downward movements of each of said gathering cups for raising and lowering the sealing plunger associated therewith.

14. In combination with a forehearth for molten glass, a pair of gob chutes arranged in position along the front of the forehearth with their inlet ends adjacent the forehearth and their outlet ends converging to a common point, a pair of gathering cups, each of said cups having a compressed air port therein, a sealing plunger associated with each said cup and controlling the opening of said port, means for swinging said cups laterally through a relatively small angle to position one of said cups over the forehearth and the other of said cups over one of the gob chutes, means for lowering the cup then over the forehearth and for raising the cup then over one of the chutes, and means responsive to the lateral movement of said cups for raising and lowering said sealing plungers, said last mentioned means being so arranged that during an upward or downward movement of a cup the sealing plunger receives a movement in the same direction but of larger amount than the movement of said cup.

15. In combination with a forehearth, a pair of gob chutes arranged in position along the front of the forehearth with their inlet ends adjacent the forehearth and their outlet ends converging to a common point, a pair of gathering cups, a gathering head associated with each said cup, a valve in each said head for connecting the interior of the cup with a source of suction, means for swinging said cups laterally through a relatively small angle to position one of said cups over the forehearth and the other of said cups over one of the gob chutes, means for lowering the cup then over the forehearth and for raising the cup then over one of the chutes, and means responsive to the downward movement of the cup then over the forehearth for opening said valve to connect the interior of such cup to a source of suction.

16. In combination with a forehearth, a pair of gob chutes arranged in position along the front of said forehearth and having their inlet ends adjacent thereto and their outlet ends converging to a common point, a pair of gathering cups, a cut-off knife associated with each said cup, means for swinging said cups through a relatively small angle to position one of said cups over the forehearth and the other of said cups over one of the gob chutes, means for lowering the cup then over the forehearth and for raising the cup then over one of the gob chutes, and means responsive to the upward movement of the cup then over the forehearth for operating the knife associated with such cup to move it across the bottom of said cup.

17. Apparatus for feeding gobs of molten glass from a forehearth to the molds of a glass forming machine comprising a pair of gob chutes arranged in position along the front of the forehearth with their inlet ends adjacent the forehearth and their outlet ends converging to a common point, a pair of suction gathering cups, means for swinging said cups laterally through a relatively small angle to position one of said cups over the forehearth and the other of said cups over one of the gob chutes, means for lowering the cup then over the forehearth and for raising the cup then over the chute, means for connecting the interior of the cup then lowered into the forehearth to a source of suction to gather a charge therein, and means for connecting the cup then over one of the chutes to a source of suction to expel the charge therefrom.

JOHN TIPPING.